United States Patent
Diab et al.

(10) Patent No.: US 8,001,399 B2
(45) Date of Patent: Aug. 16, 2011

(54) SYSTEM AND METHOD FOR SECURE COMMUNICATION FOR POWER OVER ETHERNET BETWEEN A COMPUTING DEVICE AND A SWITCH

(75) Inventors: Wael William Diab, San Francisco, CA (US); Hemal Vinodchandra Shah, Trabuco Canyon, CA (US); Simon Assouad, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 839 days.

(21) Appl. No.: 11/929,740

(22) Filed: Oct. 30, 2007

(65) Prior Publication Data
US 2009/0070603 A1 Mar. 12, 2009

Related U.S. Application Data

(60) Provisional application No. 60/971,691, filed on Sep. 12, 2007.

(51) Int. Cl.
*G06F 1/26* (2006.01)

(52) U.S. Cl. ........ 713/310; 713/300; 713/321; 713/153; 713/168; 307/126

(58) Field of Classification Search .......... 713/300, 713/310, 340, 153, 168, 321; 307/126
See application file for complete search history.

(56) References Cited

U.S. PATENT DOCUMENTS

| | | | |
|---|---|---|---|
| 6,970,566 B1* | 11/2005 | Kimura | 380/282 |
| 7,188,260 B1* | 3/2007 | Shaffer et al. | 713/300 |
| 2006/0224901 A1* | 10/2006 | Lowe | 713/186 |
| 2008/0005433 A1 | 1/2008 | Diab et al. | |
| 2008/0005600 A1 | 1/2008 | Diab et al. | |
| 2008/0005601 A1 | 1/2008 | Diab | |
| 2008/0016263 A1 | 1/2008 | Diab et al. | |

* cited by examiner

*Primary Examiner* — Thuan N Du
(74) *Attorney, Agent, or Firm* — Duane S. Kobayashi

(57) ABSTRACT

A system and method for secure communication for power over Ethernet (PoE) between a computing device and a switch. Various power management information can be used as inputs in a process for determining a power request/priority. This power management information can be communicated in Layer 2, Layer 3, or higher messaging during initial power allocation and ongoing power reallocation. Encryption of such messaging enables confidentiality, secure allocation processes, and prevention of denial of service attacks.

12 Claims, 4 Drawing Sheets

SYSTEM AND METHOD FOR SECURE COMMUNICATION FOR POWER OVER ETHERNET BETWEEN A COMPUTING DEVICE AND A SWITCH

This application claims priority to provisional application No. 60/971,691, filed Sep. 12, 2007, which is incorporated by reference herein, in its entirety, for all purposes.

BACKGROUND

1. Field of the Invention

The present invention relates generally to Power over Ethernet (PoE) and, more particularly, to a system and method for secure communication for PoE between a computing device and a switch.

2. Introduction

The IEEE 802.3af and 802.3at PoE specifications provide a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

In the PoE process, a valid device detection is first performed. This detection process identifies whether or not it is connected to a valid device to ensure that power is not applied to non-PoE capable devices.

After a valid PD is discovered, the PSE can optionally perform a power classification. In a conventional 802.3af allocation, each PD would initially be assigned a 15.4 W power classification after a Layer 1 discovery process. An optional classification process could then reclassify the PD to a lower power level. For example, a Layer 2 classification engine can be used to reclassify the PD. In general, a Layer 2 classification process can be included in PoE systems such as 802.3af, 802.3at or proprietary schemes.

In general, Layer 2 communication can be used to enable a determination of an amount of power to be allocated to a PD. Where a PD such as a computing device has rapidly changing power needs, the Layer 2 communication can be used to transmit various power management information relevant to the PD's current or anticipated needs. Examples of such power management information include battery information, computing device component information, external device information, user information, application information, or the like What is needed therefore is a mechanism for managing the PoE communication.

SUMMARY

A system and/or method for secure communication for PoE between a computing device and a switch, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
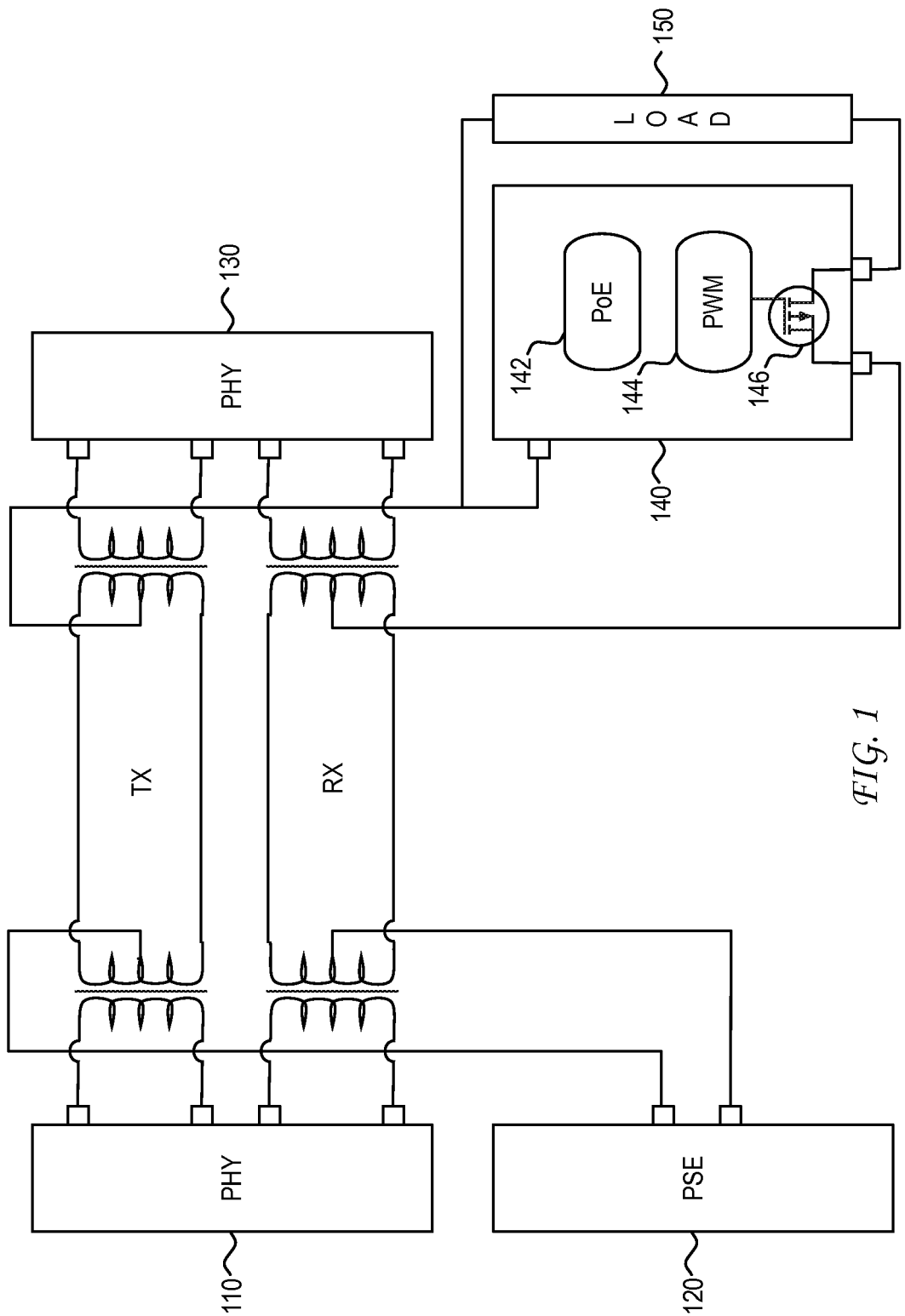
FIG. 1 illustrates an embodiment of a PoE system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10 GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3 at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W of power to a PD over 2-pairs or 60 W of power to a PD over 4-pairs. Other proprietary solutions can potentially deliver even higher levels of power to a PD. In general, high power solutions are often limited by the limitations of the cabling.

As noted, one of the responsibilities of PSE 120 is to manage the power that is supplied to PD 140. One example of a PD is a computing device, such as a laptop computer or other software controlled device such as embedded devices having an operating system (OS). This computing device can have highly varying power requirements depending on the existence and state of operation of various internal or externally supported components. These components need not be uniform and can vary greatly between devices depending on the manufacturer and component suppliers. Power usage can also be highly dependent on the application(s) running on the computing device.

In one operating state, the computing device can be in relatively idle state or performing simple tasks such as word processing. In another operating state, the computing device can be performing a variety of simultaneous tasks such as video encoding, disc burning, game playing, and even powering other external USB devices. In another operating state, the CPU(s) and system memory will be offline and the operating system/host software will not be running. In this OS-absent state, only a few components like a LAN device (possibly integrated with a management controller) will be running offline applications like management. In general, transitions between operating states such as those exemplified above, can be rapid and continual.

Computing devices that are connected to enterprise networks are often connected on a non-permanent basis. Consider, for example, a corporate conference room that has multiple Ethernet ports for conference participants. In this conference room context, the switch box typically includes 5-20 ports for the entire conference room. In typical conference room usage scenarios, the limited PSE power supply would often be oversubscribed. This results since each computing device may require 13 W to hold the battery level at a steady state under a typical usage scenario, and greater power for charging of the battery in the portable computing device. In combination, the PSE only has enough power to support a subset of the computing devices, each of which is attempting to extract as much power from the PSE as possible. The allocation of power to the various competing computing devices represents a significant challenge. Such a challenge is best met by identifying differences in the various computing device needs and priorities.

Figure 2:
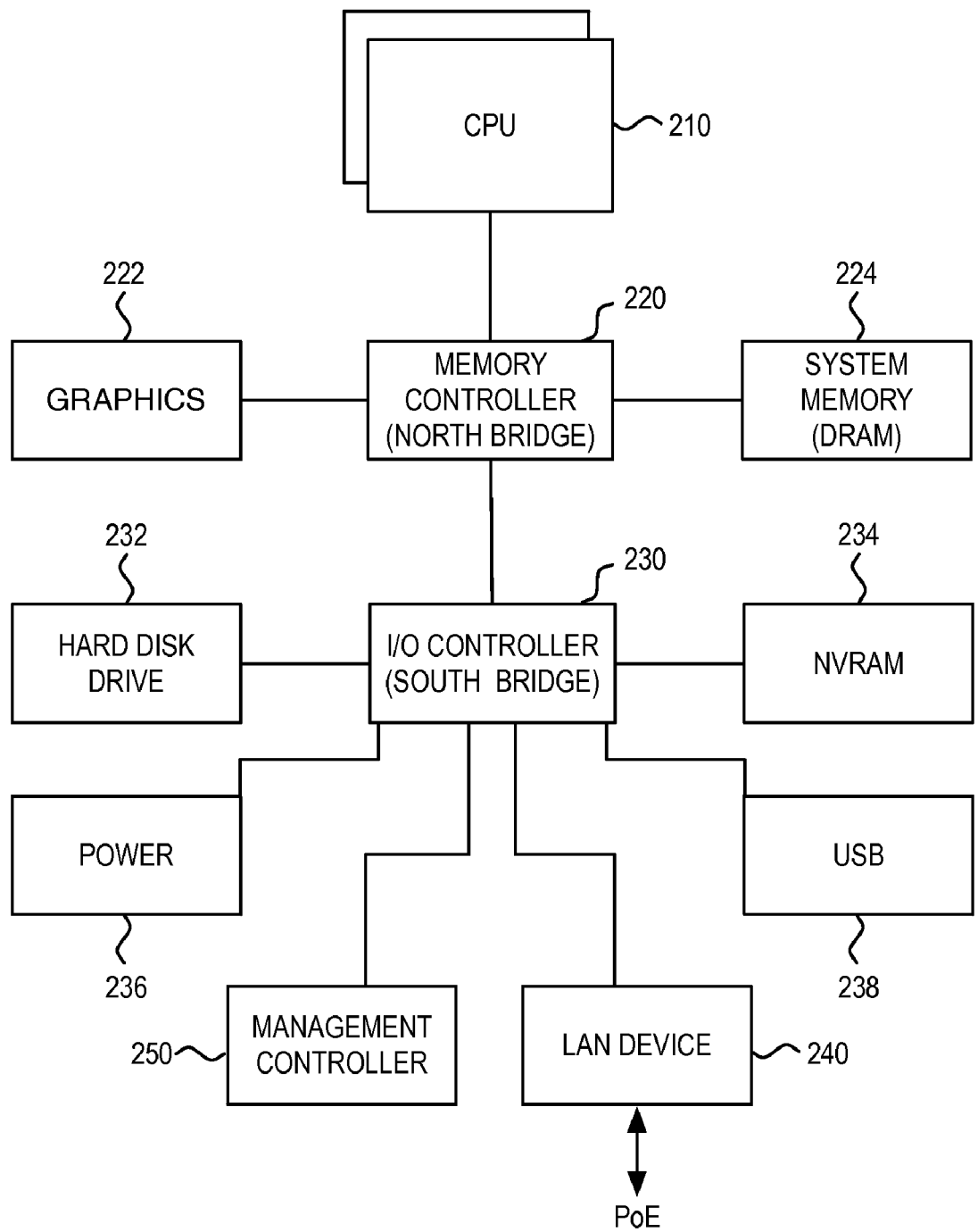
FIG. 2 illustrates an embodiment of a portable computing device.

In the illustration of FIG. 2, a computing device includes conventional computing components such as CPU(s) 210, memory controller (north bridge) 220, and I/O controller (south bridge) 230. As illustrated, memory controller 220 can be coupled to graphics subsystem 222 and main system memory 224. I/O controller 230, on the other hand, can also be coupled to various components, including hard disk drive 232, nonvolatile RAM (NVRAM) 234, power subsystem 236 and USB controller 238. As would be appreciated, the example embodiment of FIG. 2 is not intended to be exhaustive or limiting. Various other memory controller and I/O controller configurations can be used with the principles of the present invention.

As FIG. 2 further illustrates, I/O controller 230 is also in communication with LAN device 240. In general, LAN device 240 provides networking functionality onto the motherboard, thereby eliminating the need for an add-in network interface card (NIC). In one embodiment, LAN device 240 includes a fully integrated 10/100/1000BASE-T Gigabit Ethernet media access controller (MAC), PCI Express bus interface, on-chip buffer memory, and integrated physical layer (PHY) transceiver in a single-chip solution. In other embodiments, the PHY may not be integrated such as when initially supporting higher-end PHYs (e.g., 10GBASE-T). In other embodiments, LAN device 240 can also include a wireless communication component.

LAN device 240 can be designed to gain access to power management information for use by PoE management. In various examples, power management information can include one or more of the following: battery information (e.g., battery capacity, battery life, etc.); CPU status information (e.g., running, idle, etc.); CPU performance information (e.g., supply voltage, processor frequency, etc.); device state information for devices such as a hard drive, DVD drive, USB device, etc.; system information (e.g., active, sleeping, etc.); application load information; user information (e.g., user priority levels); or any other information that would be relevant to power management.

In one embodiment, LAN device 240 can be designed to interrogate components (e.g., battery) in the computing device for the power management information. In another embodiment, LAN device 240 can receive power management information from a collection component in the computing device. In general, this collection component can be designed to retrieve power management information from the various hardware and/or software components in the computing device and deliver the retrieved power management information to LAN device 240. In one embodiment, the collection component is embodied in software such as a driver, an application, an operating system, etc.

Regardless of the method by which LAN device 240 gains access to the power management information, the power management information can be communicated over the network to facilitate power allocation to the various competing computing devices. In one scenario, this communication can occur even when the computing device's OS is hibernating. Here, LAN device 240 (possibly with an integrated management controller) would be used in an OS-absent environment (with CPU(s), chipset, and system memory powered down) to run offline applications. In various embodiments, the management controller is a discrete device such as that illustrated in FIG. 2, or can be integrated with memory controller 220, I/O controller 230, LAN device 240, etc.

Figure 3:
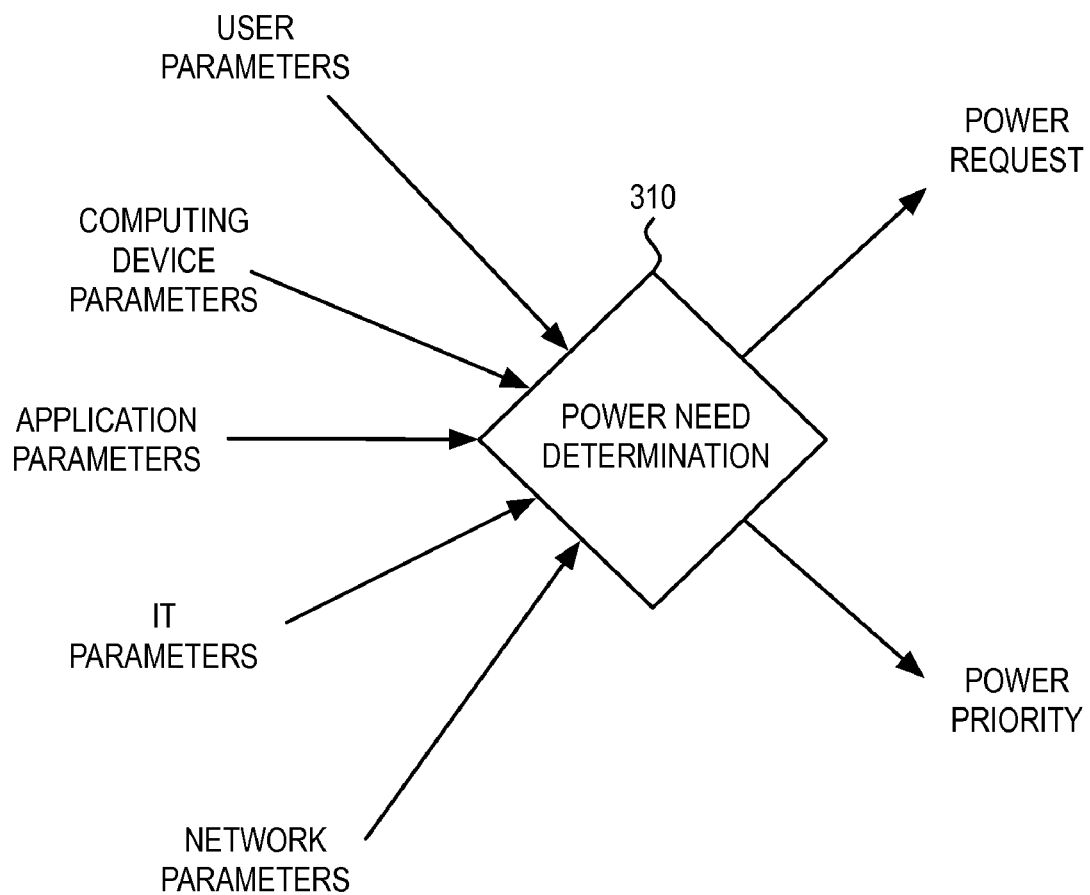
FIG. 3 illustrates an example mechanism of generating a power request and priority.

FIG. 3 illustrates an example mechanism of generating a power request and priority for a computing device. As illustrated, various power management information can be used as inputs to power need determination 310. In this example, the power management information includes general classes of information such as user parameters (e.g., management, engineering, admin, user priority level, etc.); computing device parameters (e.g., battery capacity, battery life, system states, processor states, device states, etc.); application parameters (e.g., mode of operation, application load, etc.); IT parameters (e.g., computing device model, IT policies, performance characteristic data, etc.); and network parameters (e.g., length of cable, type of cable, etc.). As would be appreciated, the principles of the present invention would not be dependent on the particular set of power management information that is used as input. With this input set of power management information, power need determination 310 can then produce a power request and power priority for the computing device.

In one embodiment, the various power management information is communicated by the computing device to the PSE for power need determination. This communication can be effected via Layer 2 packets (e.g., LLDP). In the present invention, it is recognized that the open exchange of such power management information over the network can lead to significant security compromises in the PoE system.

A first security compromise is in the exchange of confidential information. As illustrated in FIG. 3, one of the classes of parameters that is input into the power need determination process is user parameters. These user parameters can include various personal information that would enable the system to tailor a PoE request and priority to an individual. Significantly, these pieces of personal information can represent confidential information to that individual.

A second security compromise in the exchange of power management information over the network is the open exposure of elements of the PoE power need determination process. Here, an individual can monitor the network and view the types of parameters that are communicated to the PSE for a power need determination. The third party could then choose to modify the power management information that is transmitted such that his power request/priority is determined to be greater than other competing devices.

A third security compromise is represented by the risks of having an open power request process. Here, a rogue individual could flood the system with power management requests to produce a denial of service attack on the PoE system. Such a denial of service attack would overwhelm the system and likely lead to a system shut down such that other computing devices would be unable to receive power from the PSE.

For these and other reasons, it is a feature of the present invention that PoE requests that are transmitted by the various PDs are secured. In one embodiment, this security is effected through messages that are encrypted. To illustrate this process of the present invention, reference is now made to the flowchart of FIG. 4.

Figure 4:
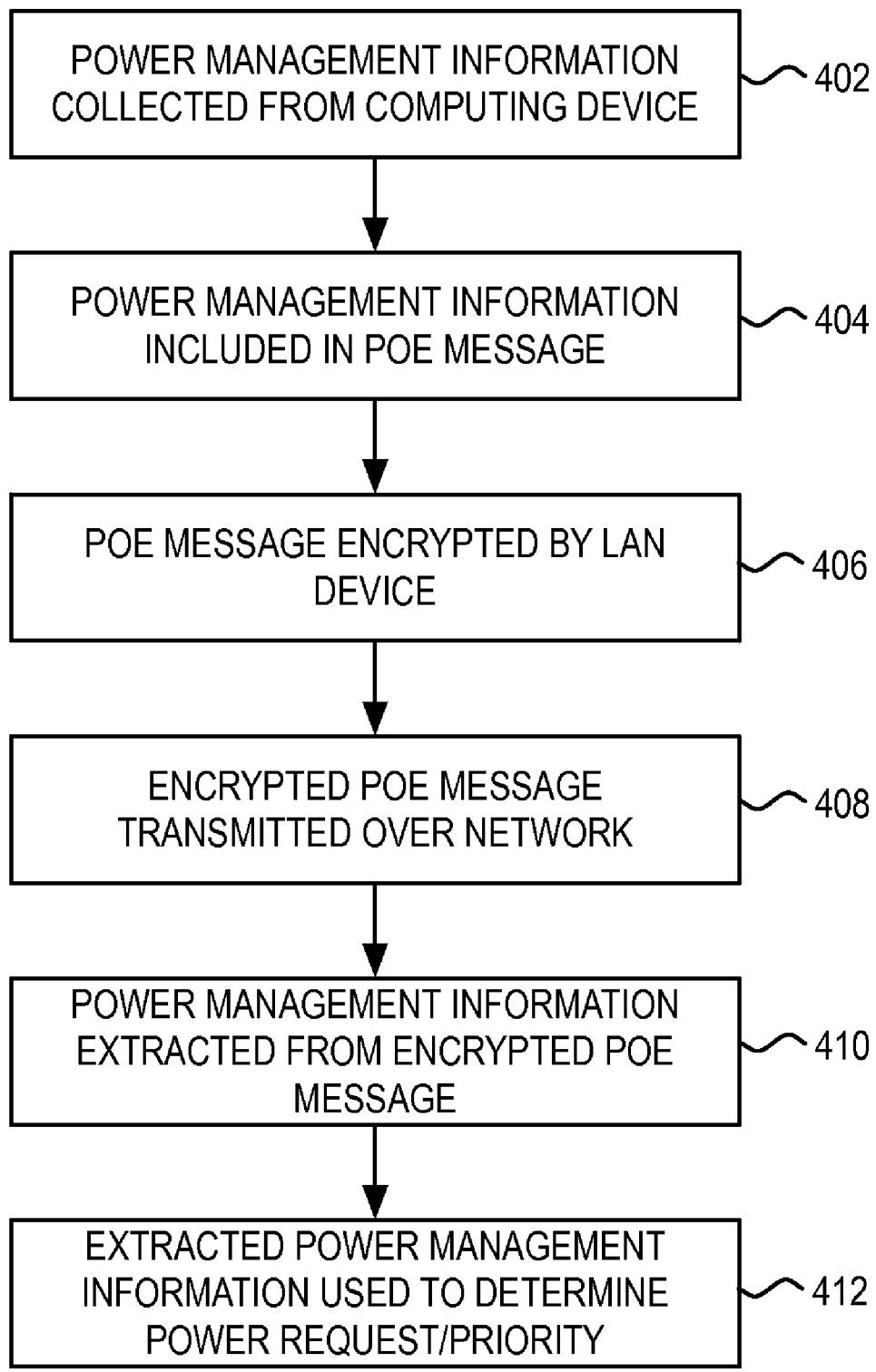
FIG. 4 illustrates a flowchart of a process of secure PoE communication.

As illustrated, the process of FIG. 4 begins at step 402 where power management information is collected from the computing device. In one embodiment, a collection component is used to retrieve power management information from the various hardware and/or software components in the computing device. As such, the collection component can be embodied in software such as a driver, an application, an operating system, etc.

At step 404, the collected power management information is included in a Layer 2 frame (e.g., LLDP), Layer 3, or higher packet PoE message. This PoE message can include formatted TLVs (type-length-value) that are defined for communication of power management information. These TLVs can be used for initial power allocation and ongoing power reallocation. In general, the TLVs enable the computing device to advertise their power management information for use in an enhanced power allocation process.

After a PoE message is created, the PoE message is then encrypted at step 406. In one embodiment, this encryption is performed in hardware such as in a LAN device. Hardware encryption in the LAN device enables the communication of an encrypted PoE message even if the CPU(s) and system memory are offline and the OS/host software is not running. At step 408, the encrypted PoE message is then transmitted over the Ethernet cable to the PSE.

Next, at step 410, the PSE decrypts the PoE message and extracts the power management information. Once the power management information is extracted from the encrypted PoE message, the PSE can then determine a power request/priority for the computing device at step 412.

Significantly, the use of encryption secures the power request/priority determination process. Malicious actions by rogue users in intercepting valid PoE messages and transmitting invalid PoE messages is thereby averted. As would be appreciated, authentication of a user or device is not enough to prevent breaches of confidentiality, rogue conduct, and denial of service attacks. Inclusion of encryption in securing the request and grant commands would provide an end-to-end solution.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet method in a local area network device container in a computing device, comprising:
    retrieving, by said local area network device, power management information that has been obtained using a software collection component in said computing device;
    encrypting, by a hardware encryption component in said local area network device, a message that includes said retrieved power management information; and
    transmitting said encrypted message from said local area network device to a switch via a network cable, said encrypted message being used to determine an amount of power to be delivered to said computing device over said network cable, wherein said transmitting occurs when said computing device is in a hibernation state.

2. The method of claim 1, wherein said retrieving comprises retrieving using an operating system when said computing device is not in said hibernation state.

3. The method of claim 1, wherein said power management information includes user information.

4. The method of claim 3, wherein said power management information further includes one of computing device information, application information, information technology information, and network information.

5. The method of claim 1, wherein said transmitting comprises transmitting via Layer 2 communication.

6. The method of claim 1, wherein said transmitting comprises transmitting via Layer 3 or higher communication.

7. A powered device in a power over Ethernet system that receives power from a power sourcing equipment via an Ethernet cable, comprising:
    a power component, said power component generating power management parameters for the powered device; and
    a local area network device, said local area network device including a hardware encryption component that generates an encrypted message that includes power management parameters retrieved by a software interrogation component from said power component, wherein said local area network device transmits said encrypted message to a switch via said Ethernet cable for determination of an amount of power that is delivered to the powered device over said Ethernet cable, said encrypted message being transmitted while the powered device is in a hibernation state.

8. The device of claim 7, wherein the powered device is a computing device.

9. The device of claim 7, wherein said power management parameters include system information reflective of an active or sleep state.

10. The device of claim 7, wherein said power management parameters include device state information.

11. The device of claim 7, wherein said local area network device provides networking functionality onto a motherboard.

12. The device of claim 7, wherein said power management parameters include user information.

* * * * *

UNITED STATES PATENT AND TRADEMARK OFFICE
CERTIFICATE OF CORRECTION

| | | |
|---|---|---|
| PATENT NO. | : 8,001,399 B2 | Page 1 of 1 |
| APPLICATION NO. | : 11/929740 | |
| DATED | : August 16, 2011 | |
| INVENTOR(S) | : Diab et al. | |

It is certified that error appears in the above-identified patent and that said Letters Patent is hereby corrected as shown below:

Column 6, line 3 replace "container" with --contained--

Signed and Sealed this
Twenty-seventh Day of September, 2011

David J. Kappos
*Director of the United States Patent and Trademark Office*